United States Patent
Hug

[19]

[11] Patent Number: 6,003,842
[45] Date of Patent: Dec. 21, 1999

[54] INSTALLATION FOR PUTTING IN ELECTRICAL CABLE FOR INDOOR INSTALLATIONS

[76] Inventor: Hanspeter Hug, Burghaldenstrasse 8 a, 3653 Oberhofen, Switzerland

[21] Appl. No.: 09/043,918

[22] PCT Filed: Oct. 4, 1996

[86] PCT No.: PCT/CH96/00352

§ 371 Date: Apr. 6, 1998

§ 102(e) Date: Apr. 6, 1998

[87] PCT Pub. No.: WO97/14203

PCT Pub. Date: Apr. 17, 1997

[30] Foreign Application Priority Data

Oct. 6, 1995 [CH] Switzerland .............................. 2828/95

[51] Int. Cl.⁶ .................................................. H02G 1/08
[52] U.S. Cl. ..................... 254/134.3 FT; 254/134.3 R
[58] Field of Search ................... 254/134.3 FT, 254/134.3 R, 134.4

[56] References Cited

U.S. PATENT DOCUMENTS

| | | | |
|---|---|---|---|
| 1,145,626 | 7/1915 | Stover | 254/134.3 FT |
| 4,454,999 | 6/1984 | Woodruff | 254/134.3 FT |
| 4,497,470 | 2/1985 | Carter et al. | 254/134.3 FT |
| 4,695,038 | 9/1987 | Giroux | 254/134.3 FT |
| 4,736,978 | 4/1988 | Cielker | 254/134.3 FT |
| 4,793,048 | 12/1988 | Kashiwaya et al. | 254/134.3 FT |
| 4,953,827 | 9/1990 | Araki et al. | 254/134.3 FT |
| 5,464,193 | 11/1995 | Wrate | 254/134.3 FT |
| 5,813,658 | 9/1998 | Kaminski et al. | 254/134.3 FT |

*Primary Examiner*—David A. Soherbel
*Assistant Examiner*—Lee Wilson
*Attorney, Agent, or Firm*—Oblon, Spivak, McClelland, Maier & Neustadt, P.C.

[57] ABSTRACT

An apparatus for installing electrical cable in an indoor location. The apparatus includes a first device for pulling and pushing a string and a second device for guiding the string in the area of a wall opening. The two devices are connected to each other through a flexible tube. A radio transmitting apparatus is used so that the first device for pulling and pushing the string can be controlled at a wall opening where the electrical cable is attached to the string. The apparatus requires a single service person, making installation easy.

9 Claims, 8 Drawing Sheets

INSTALLATION FOR PUTTING IN ELECTRICAL CABLE FOR INDOOR INSTALLATIONS

This invention relates to an installation for putting in an electrical cable for indoor installations.

DISCUSSION OF THE BACKGROUND

Such an installation is known from FR-A-2,537,795, but it has the drawback that its construction and its mounting is complicated, and the pulling element is not guided. Moreover, the installation must be mounted on the floor and on the ceiling, which is a drawback in the case of freshly painted rooms.

SUMMARY OF THE INVENTION

It is therefore the object of the present invention to avoid the drawbacks of the state of the art, and to design an installation of the initially mentioned type in such a way that it is easy to install, the pulling element is guided, and it can also be operated by just one person.

One advantage of the invention is that the first device of the installation according to the invention can be placed on the floor in the room in where electrical cable is to be put in the walls, and the second device can be installed at the wall opening with a few flicks of the wrist.

BRIEF DESCRIPTION OF THE DRAWINGS

Example embodiments of the invention, as well as their application, will be described more closely in the following, with reference to the attached drawing. Shown are.

DISCUSSION OF THE PREFERRED EMBODIMENTS

Figure 1:
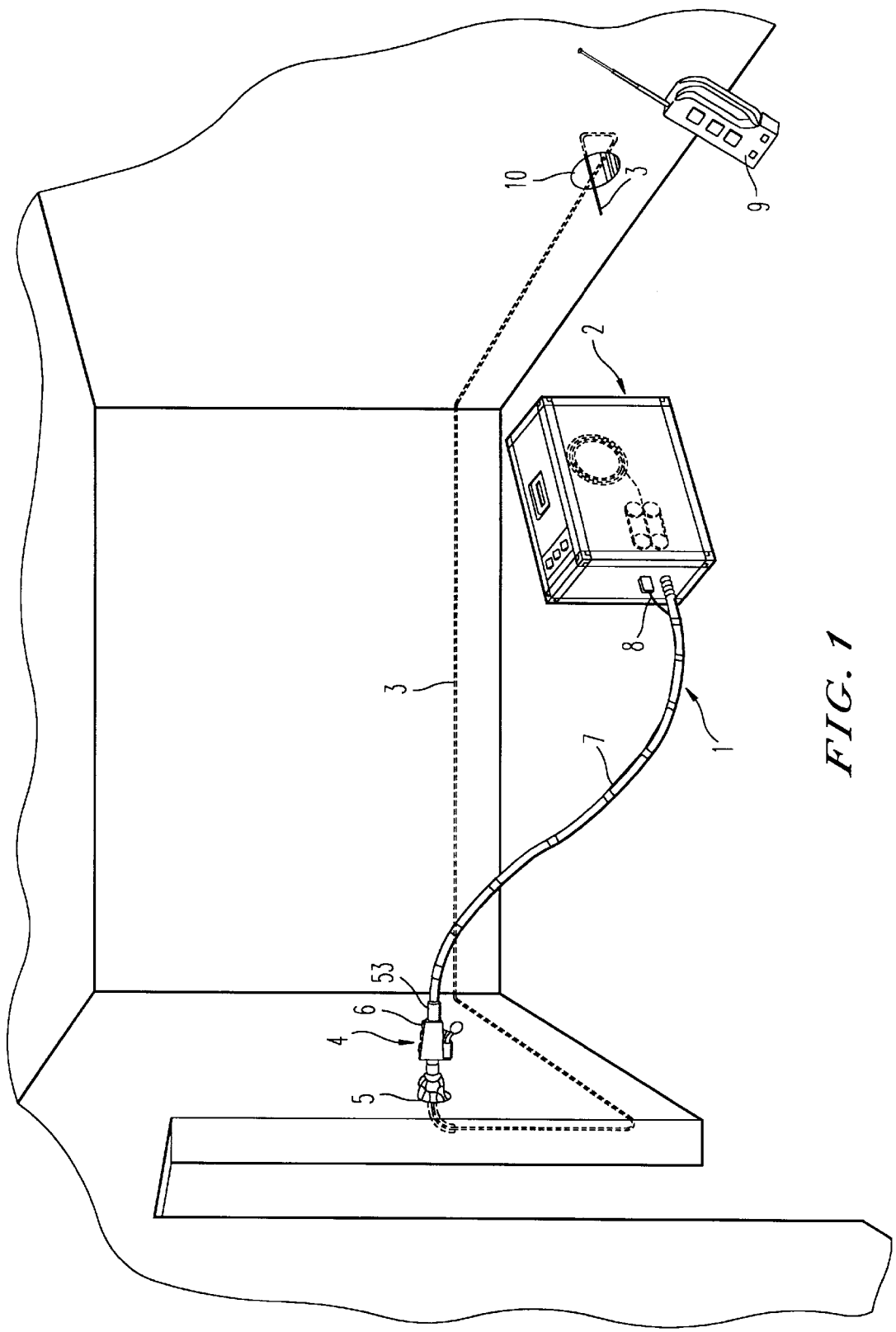
FIG. 1, a perspective overall view of the installation for putting in electrical cable for indoor installations.

Shown in perspective in FIG. 1 is the installation 1 for putting in an electrical cable for indoor installations. It comprises a first device 2 for pulling and pushing a string 3 in a cable conduit laid in the walling as well as a second device 4, which is detachably mounted in an opening 5 in the walling, and which guides the string or respectively the electrical cable in this area, this device 4 being provided with a control unit 6. The device 2 can be inserted in wall openings of between 4 and 10 cm in size, and can be put in position as desired in this area and clamped down in the opening. The device 2 and the device 4 are connected to each other through a tube 7. The tube 7 can be coated with Teflon. In addition, the control unit 6 is connected to the device 2 by a cable 8. The control of the device 2 takes place either directly at this device 2, via the control unit 6 on device 4, or through a radio transmitting apparatus 9. At the wall opening 10, where, with the device 2, the string, pushing through the wall, reemerges through the cable conduit, the electrical cable (not shown in FIG. 1) can be fastened to the string, after which this string is wound through the device 2. During winding out, the string is pushed through the flexible connecting tube 7 and a pipe 53 in the device 4 for guiding the string in and through the cable conduit provided in the walling, and this is done for a distance of at least 20 m and with an impact force of at least 50 kilo-ponds. The pull force during withdrawal of the string with the electrical cable or withdrawal of the electrical cable also amounts to at least 50 kilo-ponds. Automatic emergency stops prevent malfunctions. The entire device can be used in a mobile way, and the first device 2 is carried in a suitcase. If the pulling through of the string or of the electrical cable, respectively, is supposed to be carried out by a single service person, this person will remain at the wall opening at which the electrical cable is to be connected, and will control the device 2 for pulling and pushing using the radio transmitting apparatus 9. The string is led from the first device 2 to the wall opening 5 and afterward in the cable conduit.

Figure 2:
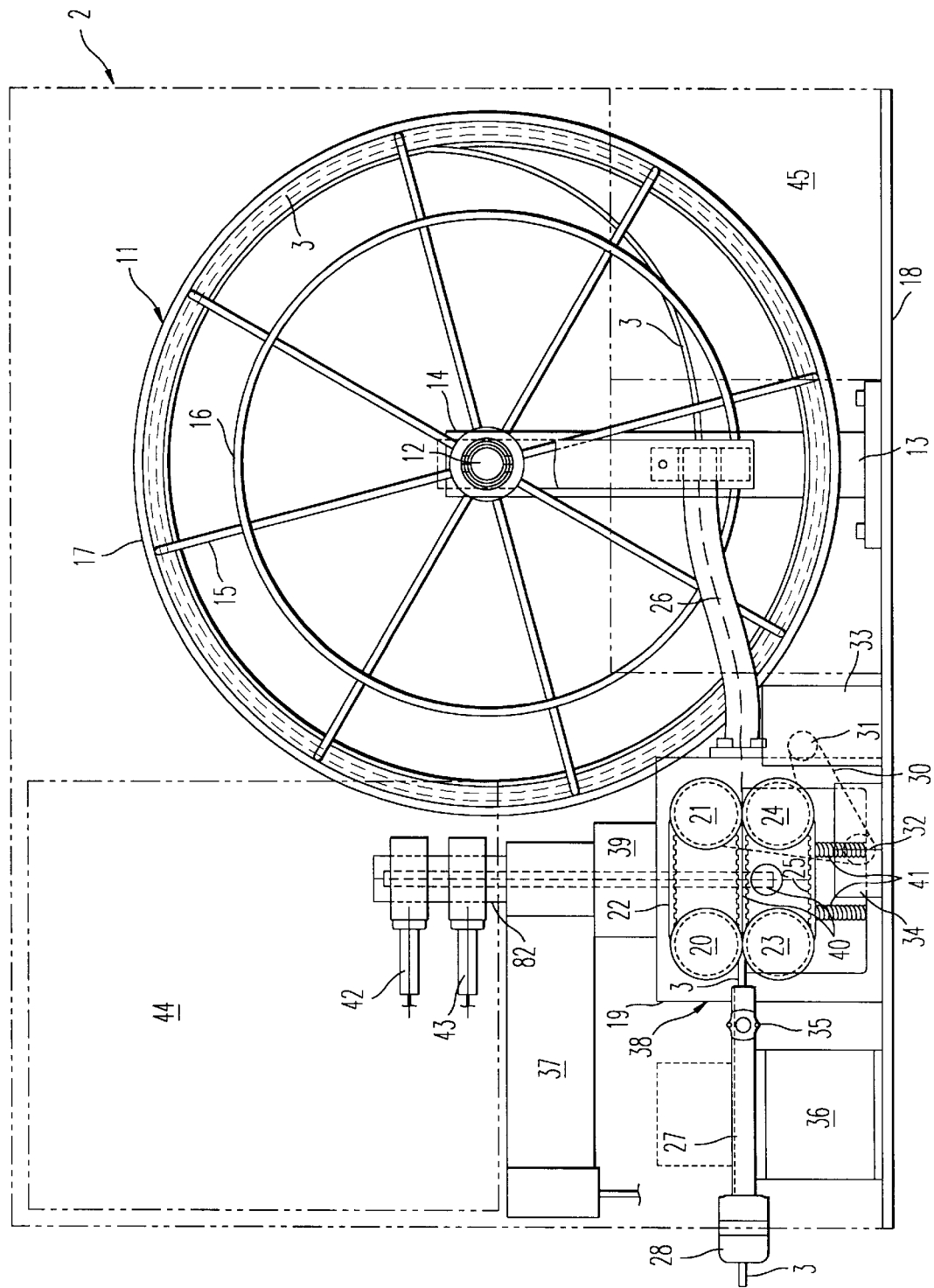
FIG. 2, is a side view of the device for pulling and pushing a string.
Figure 3:
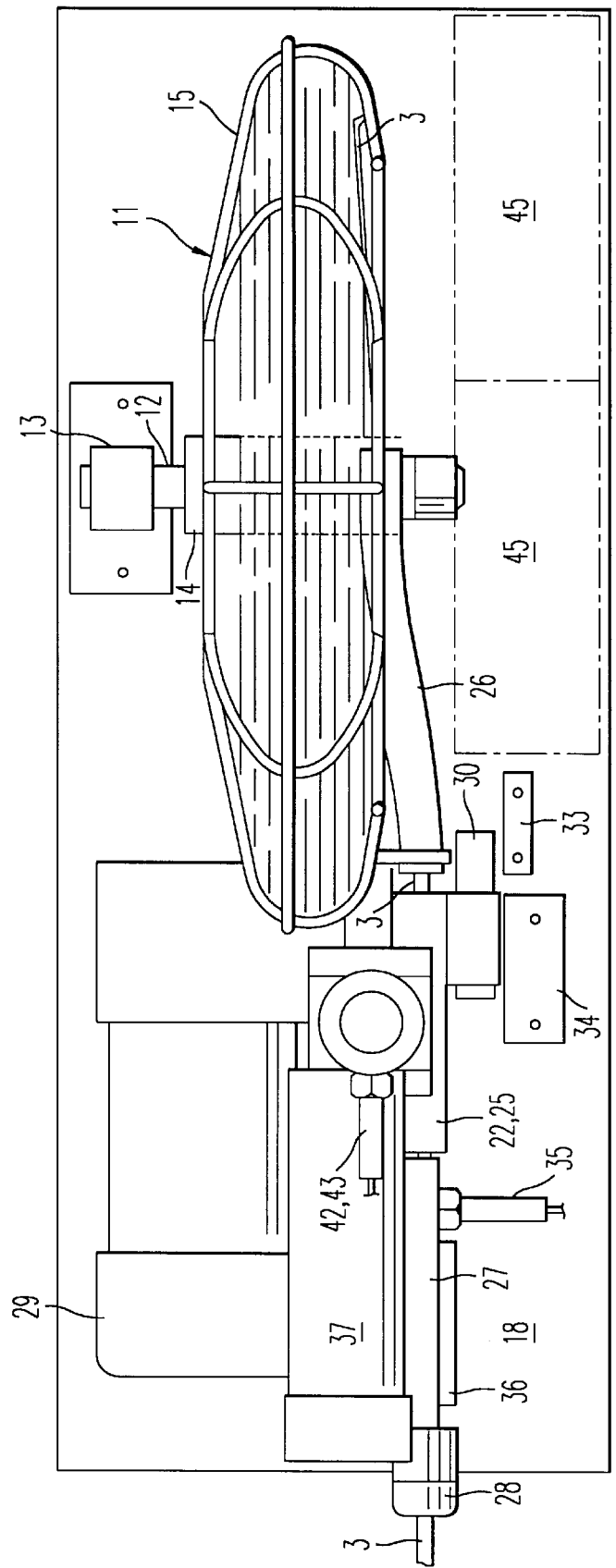
FIG. 3 is a top view of the device according to FIG. 2.

Shown in FIG. 2 is a side view of the device 2 for pulling and pushing a string 3, and shown in FIG. 3 is a top view of the device. A reel 11 is fixed with a shaft 12 to a stand 13. Side pieces 15 are fixed to a wheel hub 14. The ends of the side pieces are connected on the one side by means of a round rod 16. The end pieces are likewise connected at their outer ends by means of a round rod 17. The stand 13 is mounted on a base plate 18. The wound-up string abuts in the outer area of the side pieces 15. During winding up of the string, the string is forced to roll up on the reel by means of its spring tension. The transport mean is disposed on a holding block 19. It consists of two upper toothed belt disks 20 and 21, which are connected via a toothed belt 22, and two lower toothed belt disks 22 and 24, which are likewise connected via a toothed belt 25. The toothed belts 22 and 25 are coated on the outside with rubber. The string is led between the two toothed belts, and is either pushed out or rolled in. A guide pipe 26 leads from inside the reel to the two toothed belt disks 21 and 24. A further guide pipe 27 leads from the two toothed belt disks 20 and 23 to a connection piece 28. Visible in FIG. 3 is a geared motor 29, which drives the toothed belt disk 21. A further, double-sided toothed belt 30 is wrapped around toothed belt disks 46, 47 and two further toothed belt disks 31 and 32, and drives also the lower toothed belt disk 24. The toothed belt disk 31 is disposed on a block 33, and the toothed belt disk 32 on a block 34. Disposed on pipe 27 is a limit switch 35, which prevents the string from being pulled in entirely, a corresponding marking being provided on the end of the string. The switch is preferably designed as a contactless inductive switch. The pipe 27 is mounted on a holding block 36. A spindle lifting gearing 37 for tensioning the string transport device 38 is mounted with a block 39 on the holding block 19. The vertically movable spindle 82 presses the toothed belt disks 23 and 24, mounted on a plate 40, with the toothed belt 25 downward against the pressure of springs 41, whereby the string 3 is no longer clamped in between the toothed belts 22 and 25. The movement of the spindle is registered by the contactless, inductive limit switches 42 and 43. The connections of the motor 29 of the spindle lifting gearing 37 and of the limit switch 35, 42 and 43 are connected to the electric control 44 (represented only schematically). The driving of the device 2 follows through accumulators disposed therein.

Figure 4:
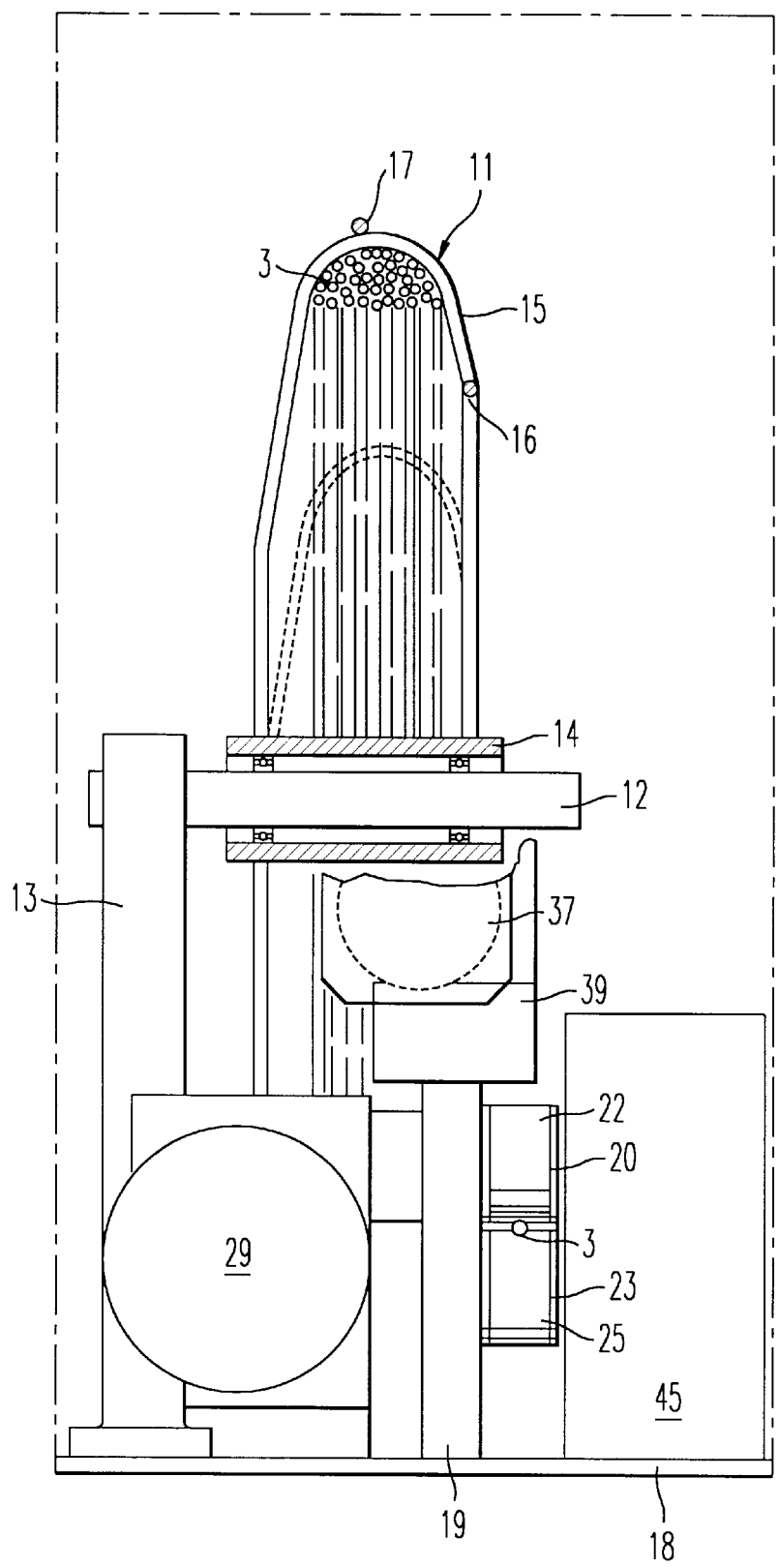
FIG. 4 is a front view of the device according to FIG. 2.

FIG. 4 shows a front view of the device for pulling and pushing a string.

Figure 5:
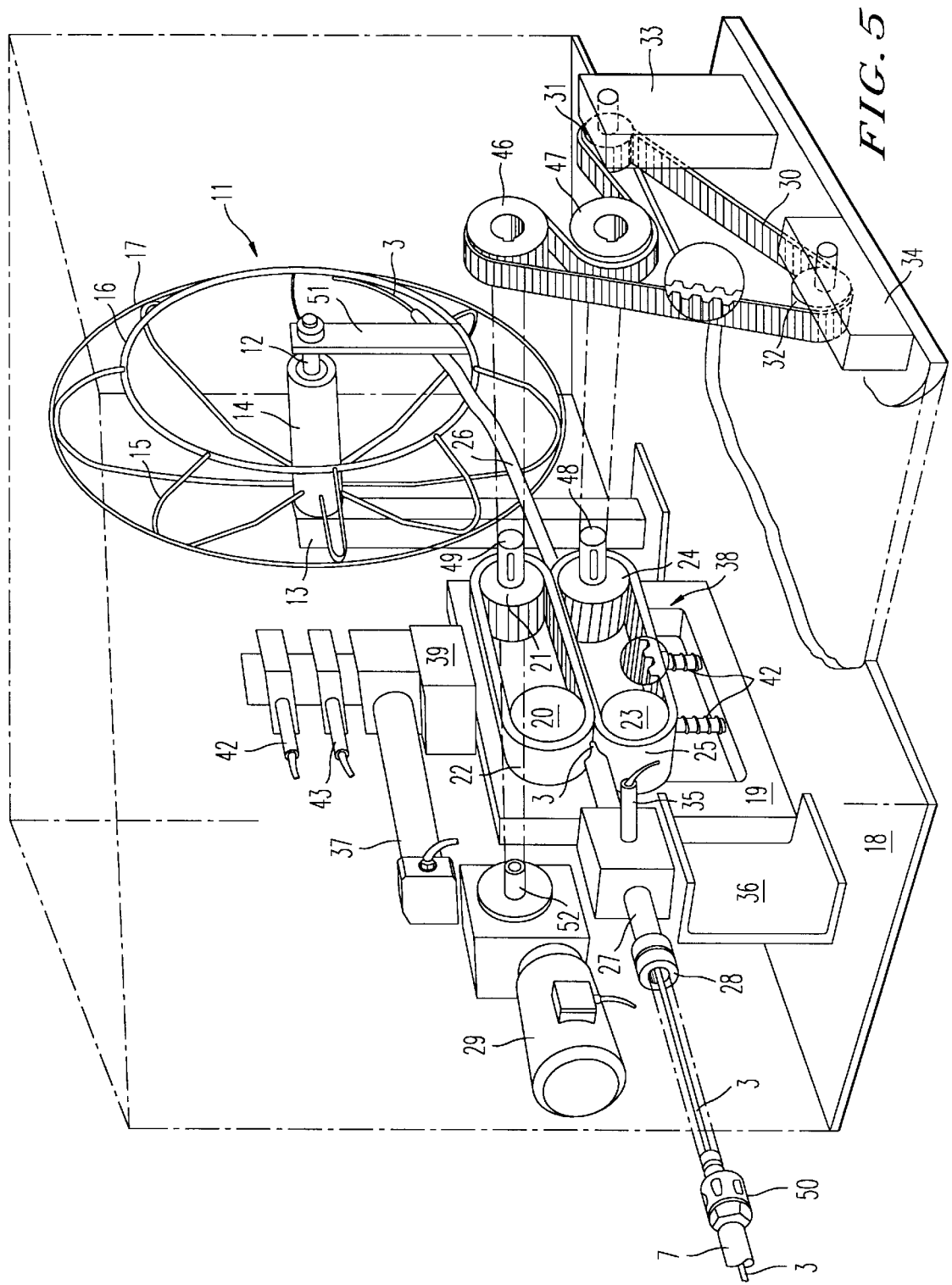
FIG. 5 is a representation in perspective of the device according to FIG. 2.

FIG. 5 shows a perspective view of the device according to FIGS. 2 to 4.

It can be seen from this figure that the two toothed belt disks 46 and 47 can be pinned on the toothed belt disks 21 and 24 by means of pins 48 and 49 centrally disposed on the toothed belt disks 21 and 24. The connecting tube 7 can be placed on the connection piece 28 by means of an end piece 50. The pipe 26 is fixed to the shaft 12 of the reel 11 by means of a holding beam 51. Also visible in this figure is the drive shaft 52 for driving the toothed belt disk 21.

Figure 6:
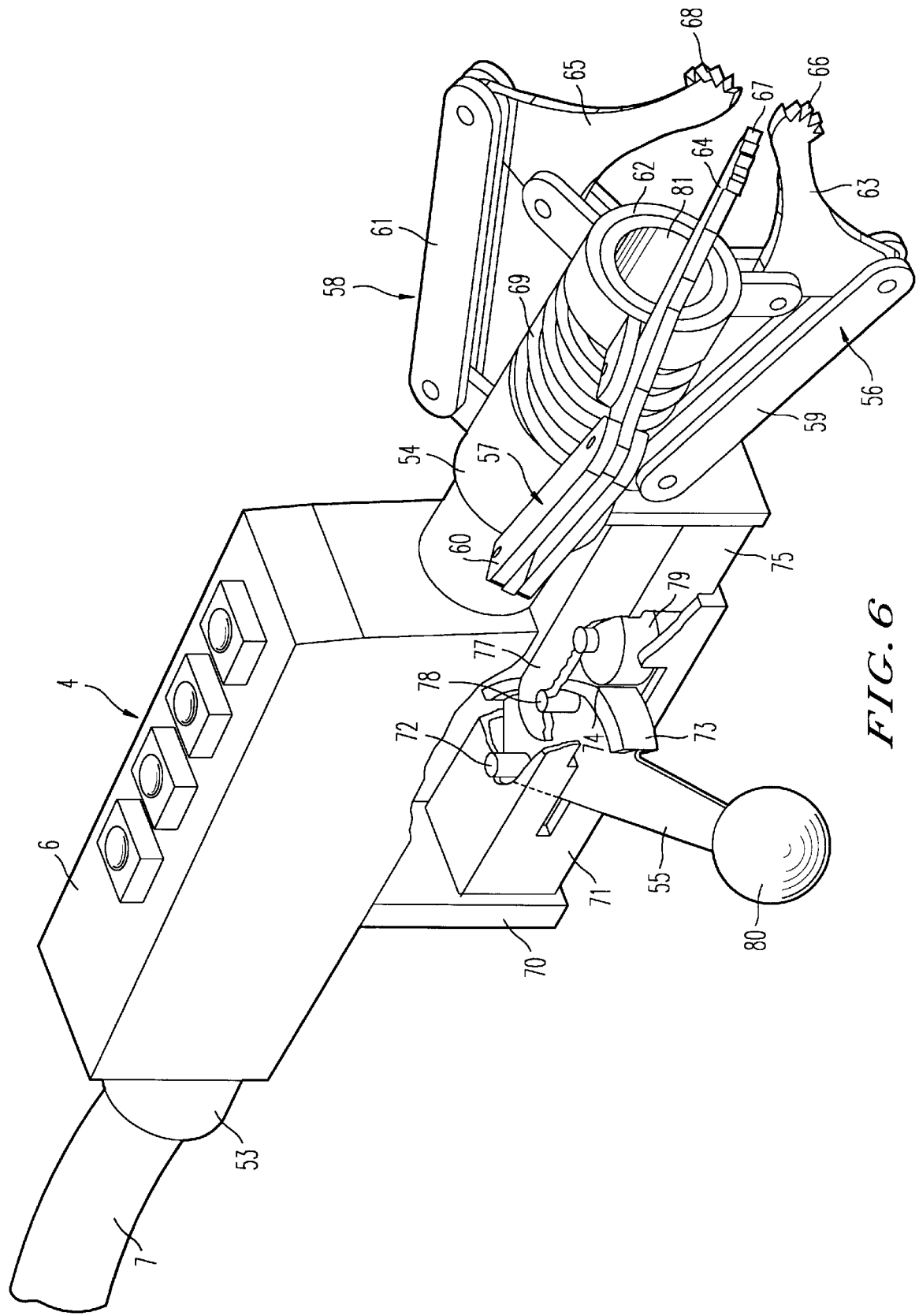
FIG. 6 is a representation in perspective of the guiding and holding device for the string in the area of a wall opening.

FIG. 6 shows in a perspective view the device 4 for guiding the string in the area of a wall opening. The control mechanism 6 is fixed to a guide pipe 53. Placed on the front part of the pipe 53 is a first pipe-shaped part 54, which can be moved back and forth on the pipe 53 through the effect of a lever 55. Fixed to this pipe-shaped part in an articulated way are three grasping arms 56, 57 and 58. The grasping arms are designed bipartite, and each comprise a first arm part 59, 60 and 61, connected by a projection on pipe part 54, and each a second arm part 63, 64 and 65 connected by a projection on a second pipe-shaped part 62. The arm parts 63, 64 and 65 are provided on their outer ends with teeth 66, 67 and 68, which engage in the wall opening 5 according to FIG. 1. The first and second arm parts are connected together in an articulated way. Disposed between the two pipe-shaped parts 54 and 62 is a spring 69. Fastened to a projection 70 of the pipe 53 is a guide part 71, rectangular in cross-section, running parallel to the pipe 53. Pivotably disposed in this guide part is the actuation lever 55 with bolt 72, sticking out therefrom upward and downward. The lever is provided with a curved part 73. The curved part 73 has a bend 74. Connected to the pipe-shaped part 54 is a projection 75, rectangular in cross-section, disposed parallel to the pipe 53. This projection has a fork-shaped part 77, on which a bolt 78 is disposed on its front end, which bolt engages behind the curved part 73 of the lever 55. Disposed between the curve 73 and the projection 75 is a toothed roller 79. To fix the device 4, this device, in the position shown in FIG. 6, with the front grasping arm parts, is brought into the wall opening, in which later a connector socket or a switch will be mounted, whereupon the lever 55, at its handle 80, is tilted away by the grasping arms, whereby these spread apart in the area of the teeth 66, 67 and 68, and hold the device 4 for guiding the string 3 in the wall opening 5. Then the tube 7 is placed on the pipe 53. The front part 81 of the pipe 53 comes to lie in the wall opening near the end of the cable conduit.

Figure 7:
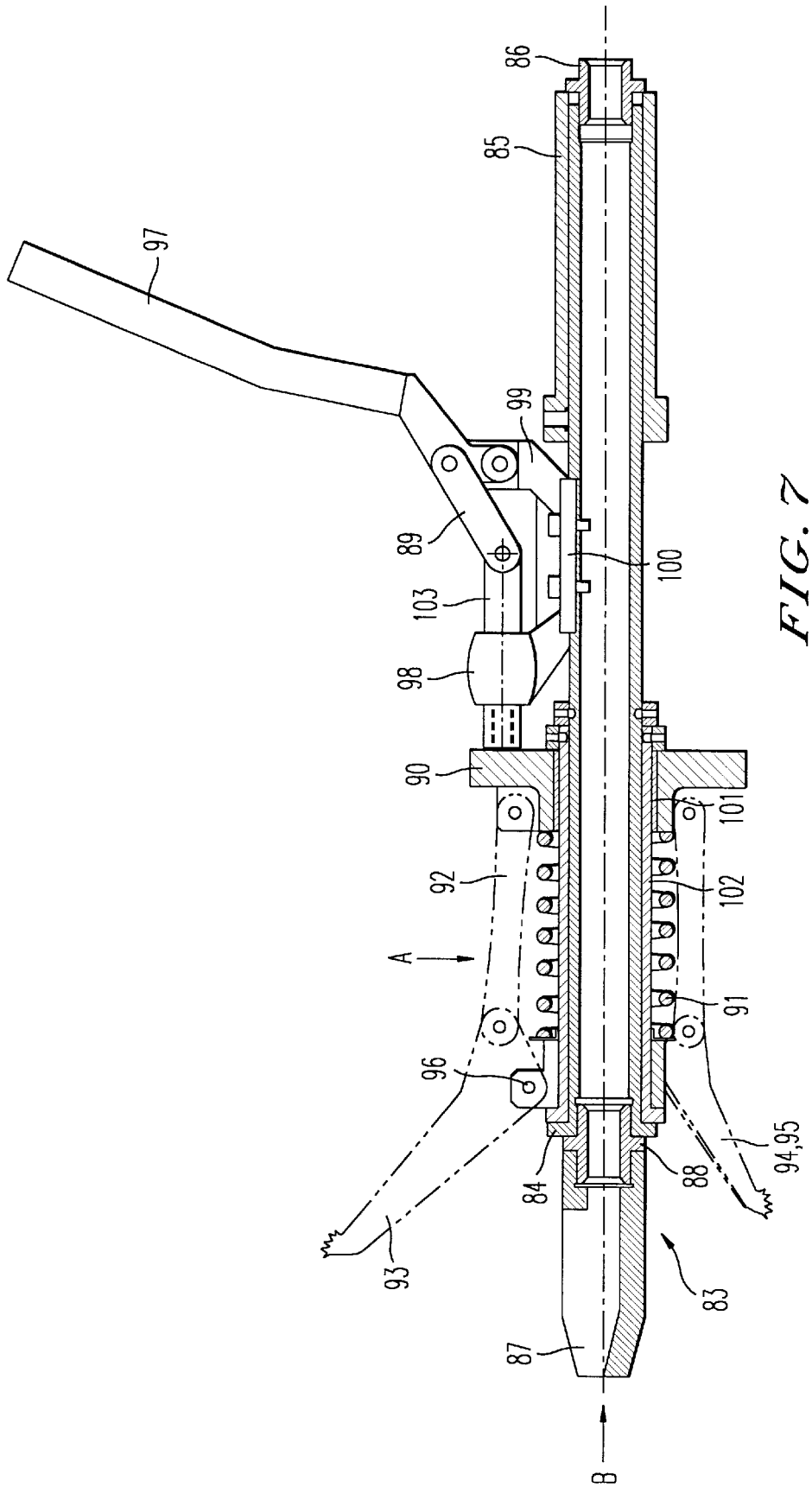
FIG. 7 is a longitudinal section through a second example embodiment of the guiding and holding device for the string in the area of a wall opening.

FIG. 7 shows a section through a further example embodiment of a device 83 for guiding the string in the area of the wall opening. A pipe 84 is provided with a handle 85 at its rear end. An adapter 86 for putting on the tube 7 is placed on the pipe in the rear. A guide blade 87 with an adapter 88 is placed on the pipe in the front. With a connecting rod tensioning element 89, a slide 90 is pushed against the pressure of a pressure spring 91 onto the pipe with a connecting rod 103, whereby the three grasping arms 93, 94 and 95, via connecting pieces 92, are turned about the turning points 96. The connecting rod tensioning element 89 is actuated by means of an extension lever 97. Via a holding element 98, 99, the connecting rod tensioning element 89 is connected to the pipe 84 by means of a mounting plate 100.

Via a sliding bearing 101, the slide 90 is movable on a bushing 102 against the pressure of the spring 91. The string, not shown in this figure, is led through the pipe 84. The grasping arms 93, 94, 95 are pivotable with the bushing 102 about the pipe 84.

Figure 8:
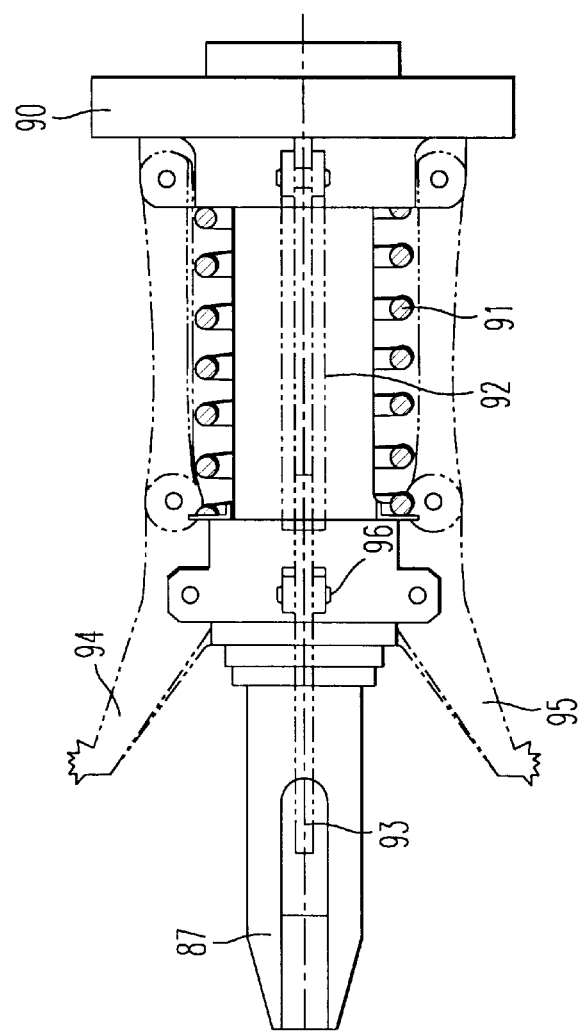
FIG. 8 is a top view according to arrow A of the device of FIG. 7.

FIG. 8 shows the front part of the device for guiding the string according to arrow A of FIG. 7. It can be seen from this figure that the grasping arm 93 is designed longer than the two other grasping arms 94 and 95, which are the same length. It is thereby made possible that the device for guiding the string can be disposed at approximately a 45° angle to the wall opening.

Figure 9:
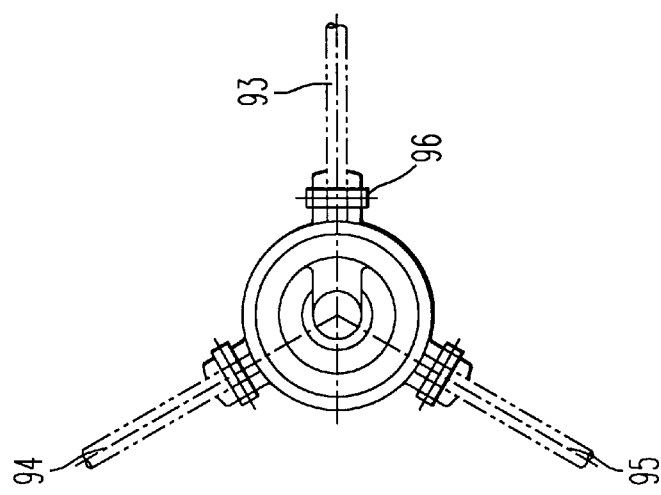
FIG. 9 is a front view according to arrow B of the device of FIG. 7.

FIG. 9 shows a top view of the device for guiding the string according to arrow B of FIG. 1.

To install the electrical cable it would also be possible to use only the first device 2 for pulling and pushing the string 3 into a cable conduit laid in the walling without the second device 4, which is detachably mounted in an opening 5 in the walling. In this case a pipe would be put on the tube 7, which pipe would be held in the opening in the walling.

I claim:

1. An installation for putting in electrical cable for indoor installations, characterized by a first device for pulling and pushing a pulling element with a reel for winding the pulling element and with a transport mechanism for the pulling element, a drive for the transport mechanism, a first guide for the pulling element, and a second device for guiding the pulling element in the vicinity of a wall opening, with holding elements, with a second guide for the pulling element and an actuation element for actuation of the holding elements, the first and the second guides being connected through a third guide, and control means, for controlling the pulling element.

2. The installation of claim 1, wherein the pulling element is formed from the group consisting of plastic and metal string.

3. The installation of claim 1, wherein the first guide comprises a first pipe, extending from the reel to the transport mechanism, and a second pipe, extending from the transport mechanism toward the outside and having a connection piece for the third guide.

4. The installation of claim 1, characterized by a first limit switch to prevent the pulling in of the string.

5. The installation of claim 1, wherein the holding elements are designed as grasping arms, which comprise first and second arm parts, connected together in an articulated way, the outer ends of the second arm parts being designed as teeth.

6. The installation of claim 1, wherein the holding elements are designed as grasping arms, a first grasping arm being designed longer than a second and third grasping arm.

7. A device for pulling and pushing a pulling element for insertion of an electrical cable for indoor installations, characterized by a reel for winding the pulling element and a transport mechanism for the pulling element, a drive for the transport mechanism and a first guide for the pulling element, the first guide including a first pipe, extending from the reel to the transport mechanism, and a second pipe, extending from the transport mechanism toward the outside and having a connection piece for a third guide.

8. The device of claim 7, wherein the pulling element is formed from the group consisting of plastic and metal string.

9. The device of claim 7, characterized by a first limit switch to prevent the pulling in of the string.

* * * * *